United States Patent
Northup et al.

(10) Patent No.: US 6,349,807 B1
(45) Date of Patent: Feb. 26, 2002

(54) METHOD AND APPARATUS FOR INHIBITING TANGLING OF CABLES

(75) Inventors: Thomas Northup; Peter C. Trieu, both of San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/501,704

(22) Filed: Feb. 10, 2000

(51) Int. Cl.[7] ................................................ E04B 2/82
(52) U.S. Cl. .................... 191/12 R; 248/49; 248/56; 248/53; 52/126.6
(58) Field of Search .................... 191/12 R; 248/49, 248/65, 68.1, 56, 53, 163.1, 83; 52/126.6, 220.3, 220.6

(56) References Cited

U.S. PATENT DOCUMENTS

| | | | | |
|---|---|---|---|---|
| 3,229,941 A | * | 1/1966 | Suliteanu et al. | 248/163 |
| 3,601,075 A | * | 8/1971 | Deslierres | 114/0.5 |
| 4,191,354 A | * | 3/1980 | Chia-Liu | 248/445 |
| 4,330,368 A | * | 5/1982 | Larson et al. | 376/460 |
| 4,643,379 A | * | 2/1987 | Potocnik | 248/49 |
| 5,548,932 A | * | 8/1996 | Mead | 52/126.6 |

FOREIGN PATENT DOCUMENTS

GB            2015959 A   *  9/1979  ............ B65H/57/00

* cited by examiner

Primary Examiner—S. Joseph Morano
Assistant Examiner—Frantz F. Jules
(74) Attorney, Agent, or Firm—Thomason, Moser & Patterson

(57) ABSTRACT

A method and apparatus for inhibiting tangling of a plurality of cables. The cable support apparatus includes a support brace having a plurality of legs, together at least partially surrounding a cable run for a plurality of cables. A side of the legs opposite the cable run is formed with a plurality of spaced apart passages for separating and guiding the plurality of cables with respect to the cable run. These passages at least partially surround corresponding cables and may be used together with a detachable clamping plate to retain the cables within the corresponding passages. The method includes passing cables to be connected to a movable member through corresponding cable passages in a first direction along an outer portion of the cable support brace and securing the cables within the cable passages. The cables are turned in a second direction substantially opposite the first direction and passed through an opening in an interior portion of the cable support brace. Finally, the cables are connected to a movable member vertically displaced from the cable guide in the second direction.

31 Claims, 5 Drawing Sheets

METHOD AND APPARATUS FOR INHIBITING TANGLING OF CABLES

FIELD OF THE INVENTION

The invention relates generally to a method and apparatus for inhibiting tangling of a cables, and, more particularly of cables attached to a movable member capable of rotation or translation.

BACKGROUND ART

There is a need for inhibiting tangling of wires, cables, and/or tubes, particularly when attached to a movable member capable of rotation or translation. Examples often are found in manufacturing, such as semiconductor processing, where various translating and/or rotating members are used to move wafers from one point to another and where rotating or translating tools are used to manipulate or act upon stationary wafers.

For example, one such apparatus in semiconductor processing is a chemical mechanical polishing (CMP) machine, a common version of which is illustrated in FIG. 1 and utilizes a rotating cross-shaped member 10 having rotating heads 20 to polish semiconductor wafers (not shown). Conventionally, a number of cables, such as control and power cables, and tubes, such as vacuum tubes, are routed from various external sources and are connected to the rotating member shown in FIG. 1. As shown in FIG. 2A, these cables and tubes 30 are stacked and routed through, for example, a plurality of upright stanchions 40 defining a channel extending from a periphery of a top part of the CMP machine to a central portion of the top part of the CMP machine. FIG. 2B shows the stacked cables and tubes 30 exiting from this channel and entering a collar hole 50 located above the rotating member 10 shown in FIG. 1 to be attached thereto. However, over time, fretting and tangling of the cables and tubes is caused by the repetitive twisting of the cables and tubes, leading to system downtime to permit technicians to manually untangle the cables and tubes from one another and a loss of productivity.

Thus, an advantage of the invention is in providing an apparatus and method for guiding a plurality of cables, wires, and/or tubes through a cable run, inhibiting or preventing tangling and thereby reducing equipment down time and improving productivity.

SUMMARY OF THE INVENTION

According to the present invention, the above and other aspects are achieved in part by providing, in one preferred embodiment, a cable support apparatus, including a support brace having a plurality of legs together at least partially surrounding a cable run for a plurality of cables, wherein a side of the legs opposite the cable run is formed with a plurality of spaced apart passages for separating and guiding the plurality of cables with respect to the cable run.

In accordance with another aspect of the invention, a chemical mechanical polishing apparatus includes a support brace having a plurality of legs together configured for establishing a cable run for a plurality of cables. This support brace also has a plurality of passages at least partially circumscribing the cable run for separating and guiding the plurality of cables between an external source and the cable run.

In accord with still another aspect of the invention, a method for inhibiting tangling of a plurality of cables attached to a movable member capable of a rotating and/or a translating motion, includes passing a plurality of cables to be connected to a movable member through a corresponding plurality of cable passages in a first direction along an outer portion of a cable support brace fixedly mounted relative to the movable member. The plurality of cables are secured within the plurality of cable passages and are turned in a second direction substantially opposite the first direction, passed through at least one opening in an interior portion of the cable support brace, and connected to a movable member vertically displaced from the cable guide in the second direction.

Additional aspects of the present invention will become readily apparent to those skilled in this art from the following detailed description, wherein only the preferred embodiment of the present invention is shown and described, simply by way of illustration of the best mode contemplated for carrying out the present invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout, and wherein.

DESCRIPTION OF THE INVENTION

In accordance with the present invention, there is provided an apparatus and method for inhibiting the tangling of wires, cables, and/or tubes (hereinafter "cables"), particularly when attached to a movable member capable of rotation or translation. The method and apparatus generally implement securing cables in passages disposed along an outer portion of a support brace and bending or turning the cables (approximately 180° in one embodiment) to pass through an opening in the interior of the cable support brace. In at least one of the embodiments, the cables are connected to a rotating member at a predetermined distance below the opening. Flexure of the cables, together with the constraints imposed by the passages and the cable run opening, results in significantly improved separation of the cables, both upstream and downstream of the cable run opening. Moreover, since a number of different cable types and sizes may be used depending on the application, the radius of curvature of these cables may also vary. To ensure proper spacing and separation, the invention also permits variation of the distance between a passage and the adjoining passages, as well as between the passage and the cable run opening.

Figure 1:
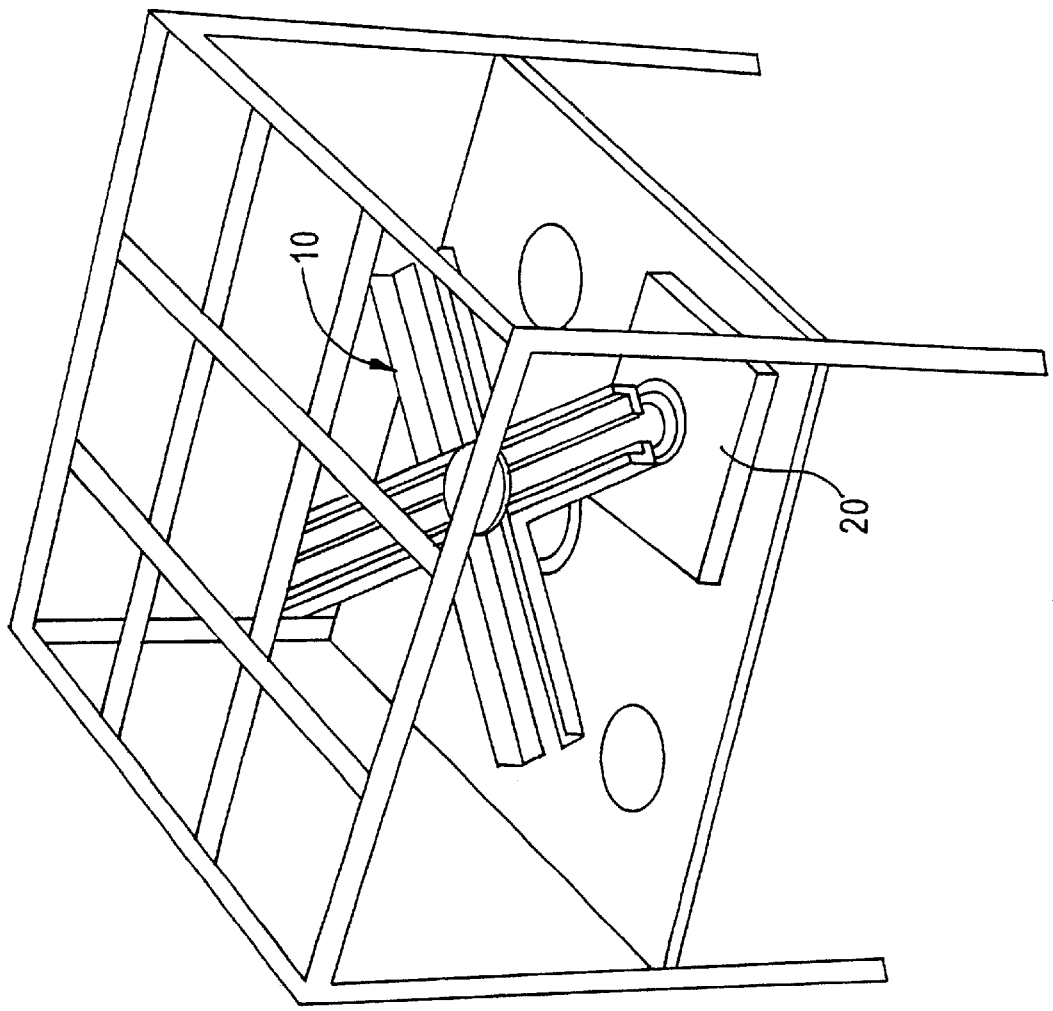
FIG. 1 schematically illustrates the structure of a conventional chemical mechanical polishing (CMP) apparatus, with rotating member and frame structure.
Figure 2A:
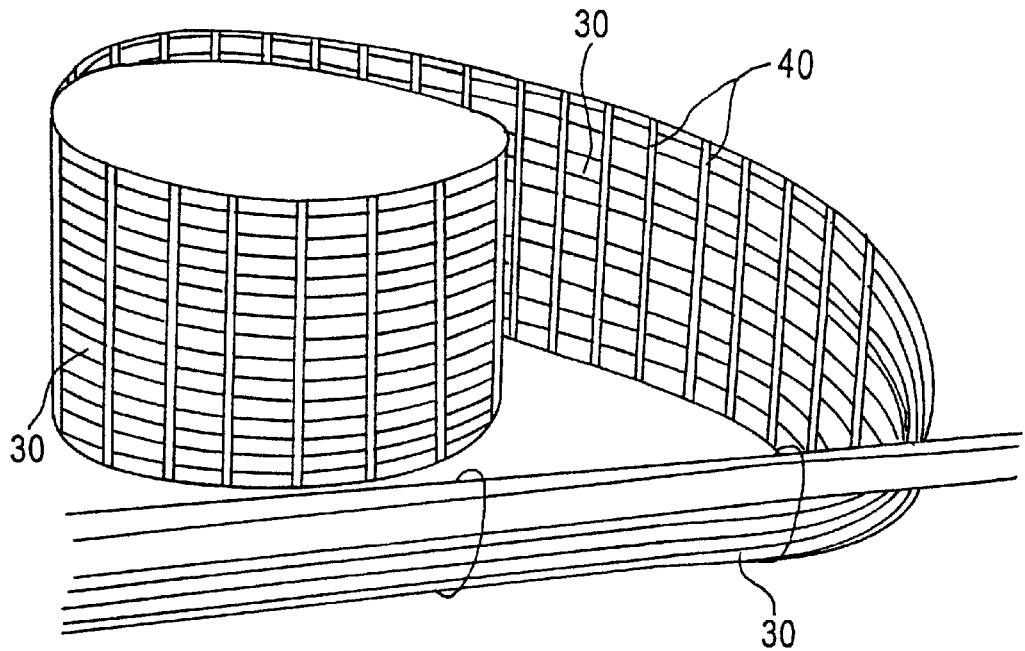
FIGS. 2A–2B schematically illustrate a conventional apparatus for routing a plurality of cables and tubes from a periphery of the CMP apparatus to a central portion thereof through a channel formed by a plurality of upright stanchions disposed above a top part of the CMP machine illustrated in FIG. 1.
Figure 2B:
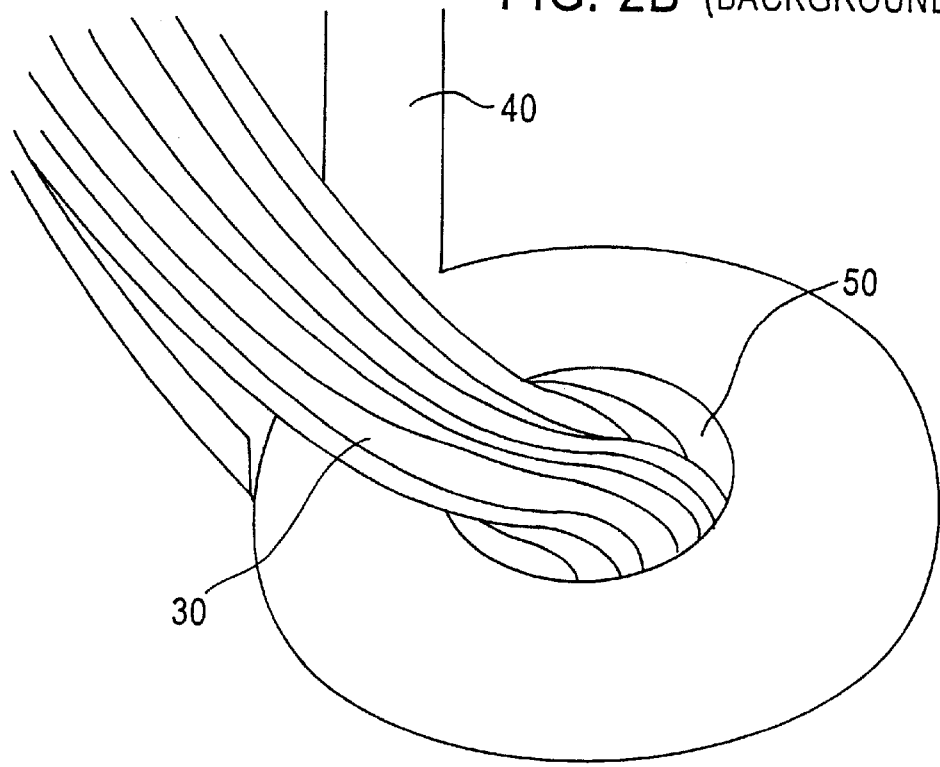
Figure 3A:
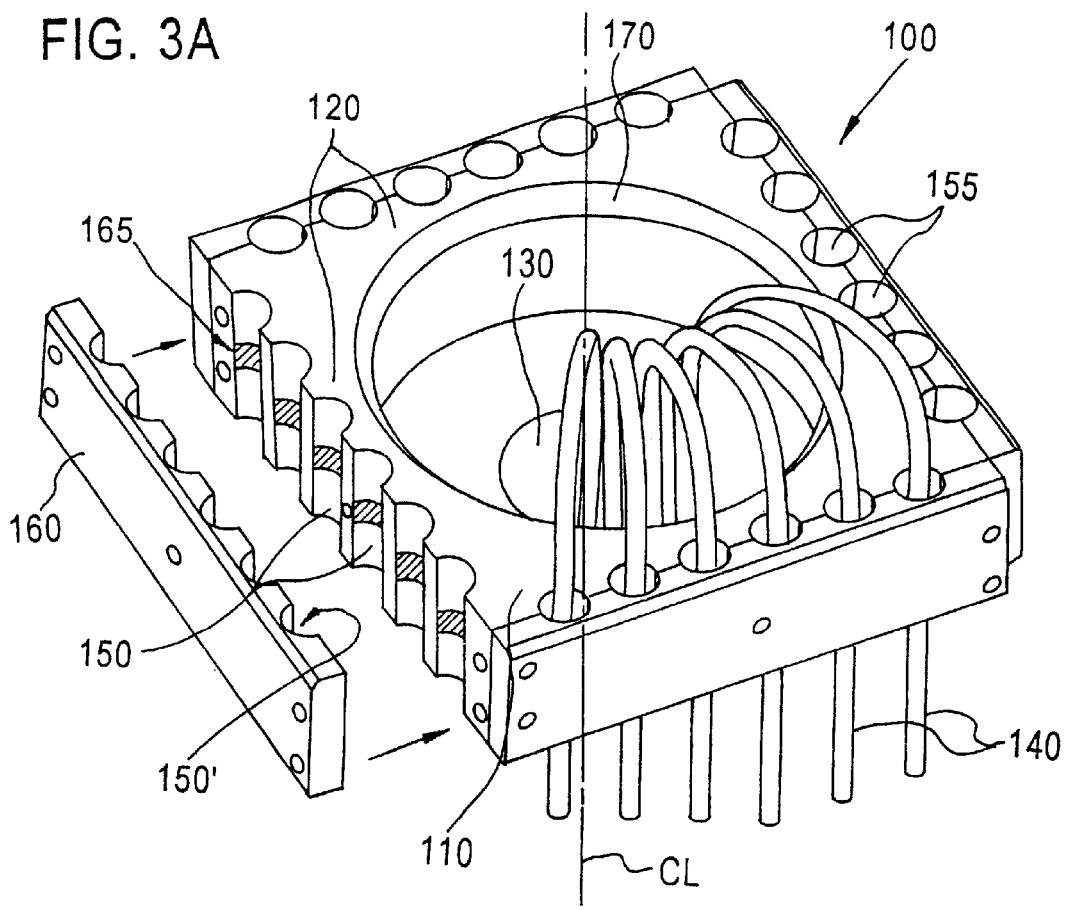
FIG. 3A is an isometric view of a first preferred embodiment of the invention.

FIG. 3A shows one embodiment of an apparatus according to the present invention in which a cable support apparatus 100 includes a support brace 110 having a plurality of sides or legs 120 together at least partially surrounding a cable run 130 for a plurality of cables 140. As shown in FIG. 3A, legs 120 form a closed square and circumscribe the cable run, although legs 120 may only partially surround the cable run. For example, the implementation legs may comprise two legs, or a single continuous leg (such as a curved body), as long as the resultant structure at least partially surrounds the cable run 130.

Sides of the legs 120 opposite the cable run 130 are formed with a plurality of spaced apart passages 150 for separating and guiding the plurality of cables 140 with respect to the cable run 130. In the embodiment of FIG. 3A, the passages are substantially perpendicular to a plane defined by the legs 120. However, these passages 150 alternatively may be inclined at a non-orthogonal angle with respect to a plane defined by the legs 120. The passages 150 may be aligned so that the center line of each of the inclined passages 150 intersects the center line CL of the cable run 130 at a point above the plane defined by the legs 120 to ensure symmetry of the cables.

Moreover, since different passages 150 may be inclined at different angles from the plane defined by the legs 120, flexure of the cables can be adjusted. In the embodiment shown in FIG. 3A, flexure is approximately 180° since the passages 150 are approximately perpendicular to the plane defined by the legs 120. However, as angles of the passages 150 are turned toward or away from the center line CL of the cable run 130, flexure will decrease or increase correspondingly.

Passages 150 partially surround corresponding cables 140, and detachable clamping plates 160 possessing cooperating passages 150' are aligned and attached such that the passages 150, 150' face one another to form a composite closed passage 155 which circumscribes the cables 140. The passages 150, 150' may be of any shape and size sufficient to secure the respective cables in place. For example, the clamping plates 160 may present a flat surface abutting the sides of the legs 120 if permitted by the particular selection of the sizes of the cables 140 and passages 150. Additionally, the clamping plates may be set off from the sides of the legs 120, creating a space therebetween. Clamping adjustment means, such as screws, shim-packs, flexible washers, or resilient materials may then be inserted within this interstice to permit adjustment of the clamping force.

Resilient members 165 are disposed within the passages 150, 150' along an entire length, or only part, of one or both of the passages. FIG. 3A shows the resilient members 165 disposed along a portion of the leg passages 150. Alternatively, the resilient member may be disposed on the portions of the cables secured by the clamping plates 160.

FIG. 3A also shows a chamfered portion 170 at a top portion of the cable run. This chamfered portion reduces the deleterious effects of fretting, particularly between the support brace and the cable jacket material. This benefit can similarly be achieved by chamfering (not shown) other corner portions, such as the upper and lower portions of each of the passages 150, 150'. Preferably, these corner portions are rounded.

Figure 3B:
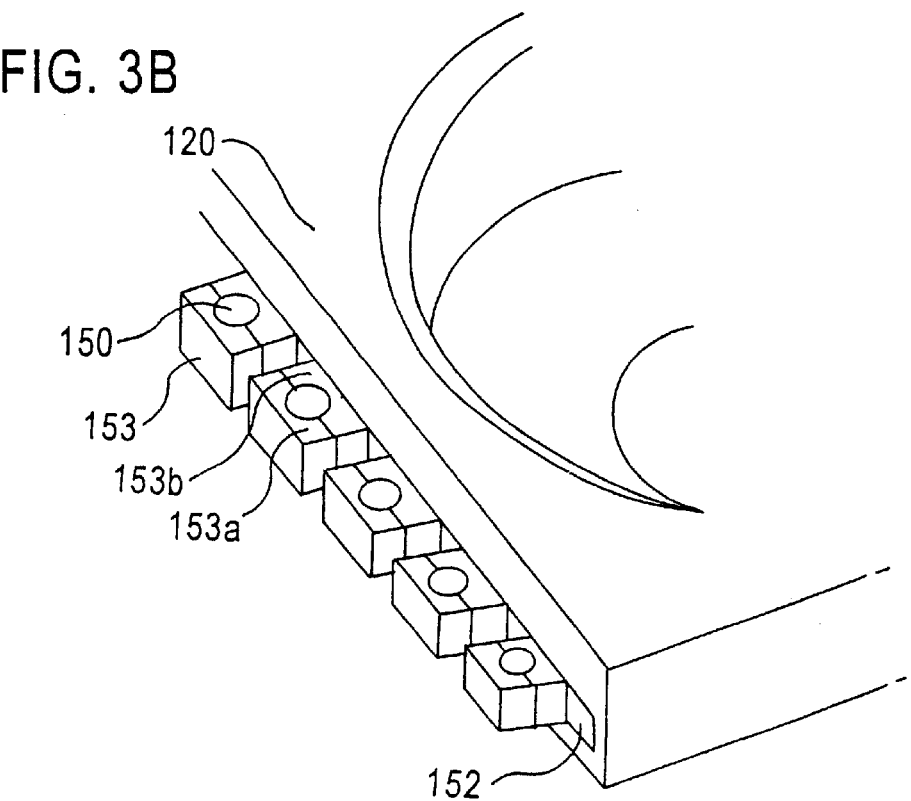
FIG. 3B is an cut-away isometric view of a second preferred embodiment of the invention.

According to a second embodiment, depicted in FIG. 3B, passages 150 are not formed in the legs of the support brace. Instead, passages 150 are external to the legs of the support brace and are provided within external support portions 153 adjacent thereto, as shown in FIG. 3B. In this embodiment, a receiving track 152 is provided along a length of a support brace leg 120. Spaced along this receiving track 152 are a plurality of external support portions 153. The external support portions 153 are divided into two sections 153a, 153b which cooperatively define passages 150 for cables 140. Thus, a plurality of passages 150 are provided wherein the clamping force on a selected cable may be independently adjusted without affecting the positioning or clamping of the remaining cables. The positions of the external support portions 153 may also be adjusted along a length of the support brace leg relative to one another, as required. Alternatively, a plurality of receiving tracks 152 may be employed along a length of a support brace leg 120, as discussed above, substantially parallel to one another. Still further, a plurality of receiving tracks 152 may be employed transverse (e.g., vertically or in the same direction of the cables) to a length of a support brace leg 120. In other words, each of the external support portions 153 can be secured within an individual receiving track 152.

Moreover, these external support portions 153 can be inclined at different angles from the plane defined by the legs 120 to permit adjustment and control of the cable flexure. As shown in FIG. 3B, flexure is approximately 180° since the passages 150 are approximately perpendicular to the plane defined by the legs 120. However, external support portions 153 may be arranged at an incline relative to the plane defined by the legs 120 to correspondingly decrease flexure. The angle of each external support portion 153 may be individually adjusted, as necessary.

Passages 150 may be of any shape and size sufficient to secure the respective cables in place and may include clamping adjustment means, such as screws, shim-packs, flexible washers, or resilient materials as necessary to permit regulation of the clamping force on the cables. Resilient members 165 (not shown) are disposed within the passages 150, as discussed in the previous embodiment, to facilitate securement of the cables. Further, the external support portions 153 passages can be chamfered at either end to reduce the deleterious effects of fretting, particularly between the external support portion and the cable jacket material. The external support portions 153 are preferably formed of a rigid plastic material or a metal, for example, as required by the particular application.

Figure 4:
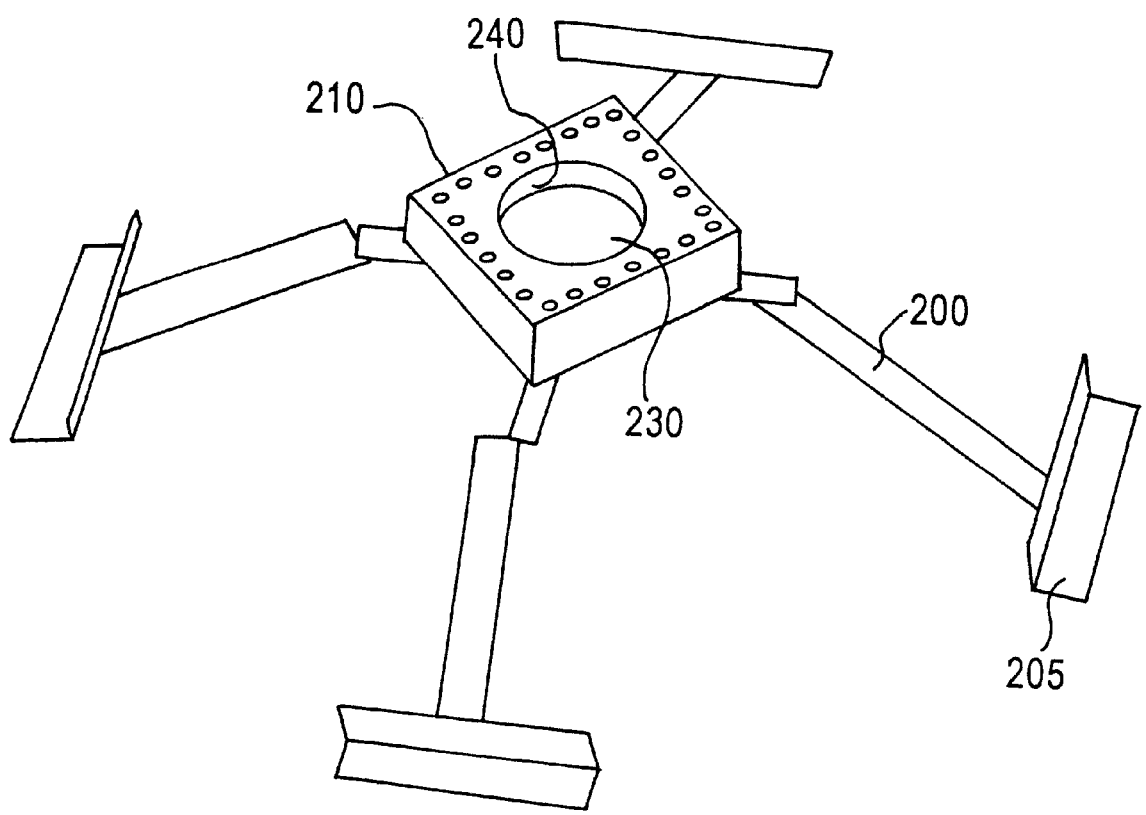
FIG. 4 is an isometric view of a third preferred embodiment of the invention.

In another embodiment shown in FIG. 4, mounting arms 200 are attached to the support brace. Four mounting arms 200 extend outwardly and downwardly from bottom portions of the support brace 210. At distal ends of the mounting arms 200 are brackets 205 to permit the mounting arms to be removably attached to a fixture (not shown). In this embodiment, the mounting arms prevent the support brace from rotating relative to the fixture and displace the support brace vertically from an object (not shown), such as a rotating object, connected to the cables (not shown) passing through opening 230 of the cable run 240.

Figure 5:
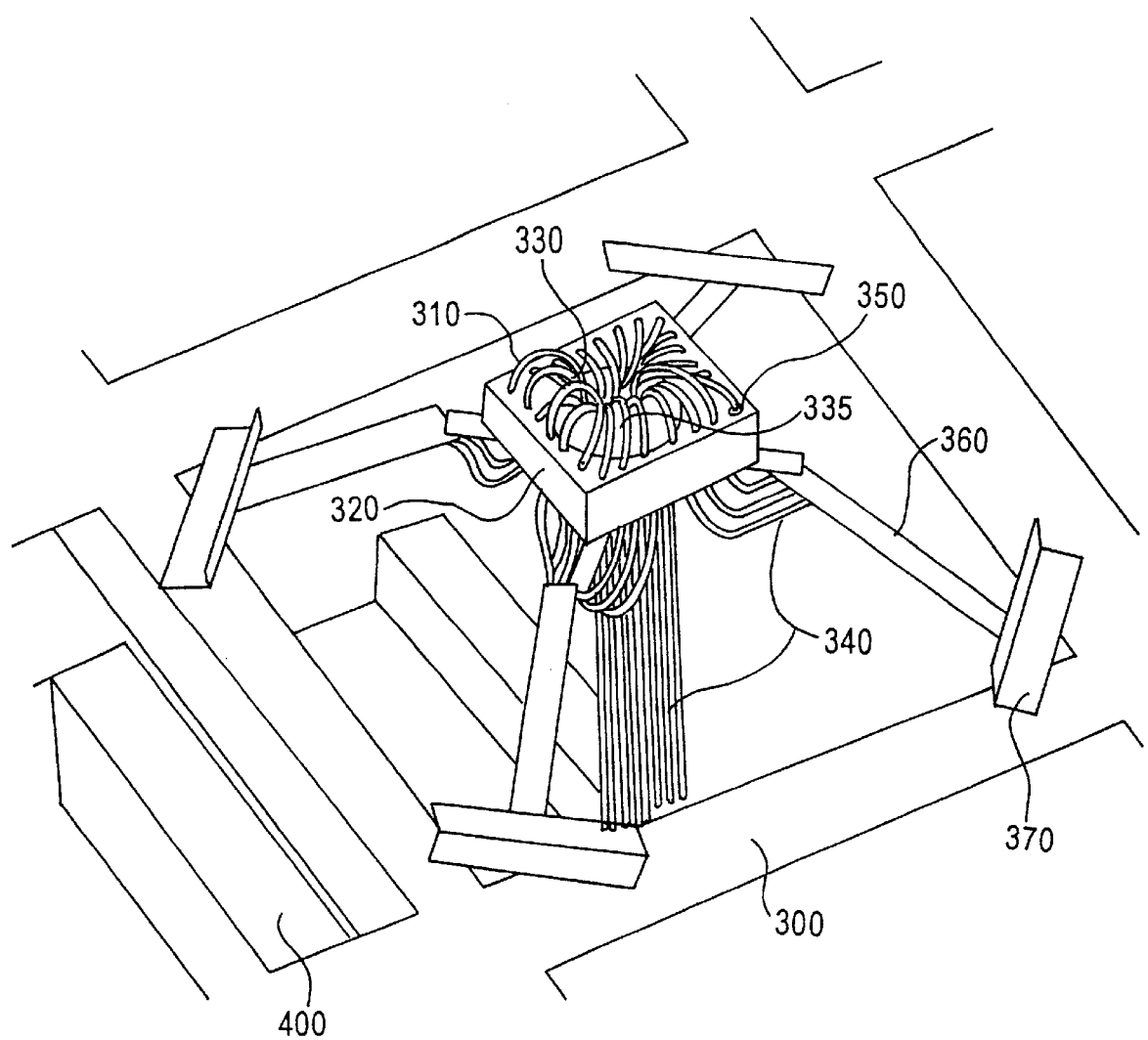
FIG. 5 is an isometric view of the third preferred embodiment of the invention disposed on the frame of a chemical mechanical polisher.

FIG. 5 shows the cable support apparatus of FIG. 4 attached to a frame 300 of a chemical mechanical polishing apparatus in accord with another embodiment. The support brace 310 of the cable support apparatus have a plurality of legs 320 together surrounding the cable run 330 for cables 340. A plurality of spaced apart passages 350 are formed in the support brace to separate and guide the cables between an external source (not shown) and the cable run. These passages 350 fully surround each of the cables. Mounting arms 360 extend outwardly and downwardly from bottom portions of the support brace 310 and are attached to the frame 300 by brackets 370, thus fixing the support brace 310 relative to the frame 300 and rotating member 400 of the chemical mechanical polishing apparatus. However, the invention may implement other means of fixing the support brace to a fixture. These fixing means may permit the mounting arms to be removably, or permanently, attached to a fixture, and may include, for example, bolts, clamps, keys, keyed slots, adhesives, and welds. Further, the attachment means may be associated with one or more mounting arms.

The cables 340 pass through the opening 335 of the cable run 330, extend down to the rotating member 400, and are attached to corresponding electrical connections on or around the rotating member. In a chemical mechanical polishing apparatus, the rotating member 400 typically rotates through an angle of about 270°. In such a case, these connections are optimally achieved while the rotating member is positioned at the midpoint of its travel, subjecting the cables to a rotational cycle of 135° clockwise and 135° counterclockwise and minimizing torsional effects.

In accordance with the invention, a method for inhibiting tangling of a plurality of cables attached to a movable member capable of rotating and/or translating motion can be understood with reference to FIG. 5. This method includes passing cables 340 to be connected to a movable member through corresponding cable passages 350 in a first direction (e.g., upward, as shown) along an outer portion of cable support brace 310, which is fixedly mounted relative to the movable member 400. The cables 340 are secured within the cable passages 350 and turned in a second direction substantially opposite the first direction (e.g., downward, as shown). As shown in FIG. 3A, the cables are turned approximately 180°, however, this angle could be greater or less than 180°. Cables 340 then are connected to the movable member 400, which is vertically displaced from the cable guide 310 in the second direction.

Thus, the above embodiments provide an apparatus and method for guiding a plurality of cables and tubes through a cable run and inhibiting or preventing the tangling of cables, thereby improving system availability. These aspects are achieved, as discussed above, by a cable support apparatus including a support brace having a plurality of legs together at least partially surrounding a cable run for a plurality of cables, wherein a side of the legs opposite the cable run is formed with a plurality of spaced apart passages for separating and guiding the plurality of cables with respect to the cable run.

It is to be understood, however, that the present invention is capable of use in various other combinations and environments and is capable of changes or modifications within the scope of the inventive concept, as expressed herein. Although the above embodiments discuss a cable support apparatus wherein cables are secured within corresponding cable passages, turned in a second direction substantially opposite to the first direction (e.g., about 180°), and passed through an opening in an interior portion of the cable support brace, other orientations are contemplated by the present invention. For example, the opening in the interior portion of the cable support brace could be oriented at other angles (e.g., 90°) relative to passages formed in or adjacent the cable support brace. Thus, using the above example, cables would be turned in a second direction perpendicular to a first direction.

What is claimed is:

1. A cable support apparatus, comprising a support brace having one or more legs disposed about a cable run having one or more cables disposed therein, wherein the legs comprise one or more spaced apart passages for separating and guiding the one or more cables, wherein the legs circumscribe the cable run, and wherein the support brace is attached to a plurality of mounting arms.

2. A chemical mechanical polishing apparatus comprising a support brace having a plurality of legs together configured for establishing a cable run for a plurality of cables and a plurality of passages at least partially circumscribing the cable run for separating and guiding the plurality of cables between an external source and the cable run.

3. A chemical mechanical polishing apparatus as claimed in claim 2, wherein the plurality of legs circumscribes the cable run.

4. A chemical mechanical polishing apparatus as claimed in claim 3, wherein the passages are configured to circumscribe corresponding cables.

5. A chemical mechanical polishing apparatus as claimed in claim 4, further comprising:
   a rotating member;
   a plurality of cables connected to said rotating member; and
   a fixing means for fixing said cable support brace in position relative to said rotating member.

6. A chemical mechanical polishing apparatus according to claim 5, wherein said fixing means is attached to at least one mounting arm.

7. A cable support apparatus according to claim 4, wherein a corner portion of at least one of a passage and said cable run is chamfered or rounded.

8. A chemical mechanical polishing apparatus according to claim 4, further comprising at least one detachable clamping plate configured to retain the plurality of cables within the corresponding plurality of passages.

9. A chemical mechanical polishing apparatus according to claim 8, further comprising resilient members disposed on an interior portion of at least one of the plurality of passages and the clamping plate.

10. A chemical mechanical polishing apparatus according to claim 4, wherein a center line of each of said plurality of passages intersects a center line of said cable run at a point above a plane defined by the plurality of legs.

11. A chemical mechanical polishing apparatus according to claim 5, wherein said fixing means comprises a weld.

12. A chemical mechanical polishing apparatus according to claim 4, wherein said cable run is substantially coaxial with a center of rotation of said rotating member.

13. A chemical mechanical polishing apparatus according to claim 3, wherein the plurality of passages are inclined at an angle with respect to a plane defined by the plurality of legs.

14. A chemical mechanical polishing apparatus according to claim 13, wherein the plurality of passages are substantially perpendicular to a plane defined by the plurality of legs.

15. A chemical mechanical polishing apparatus according to claim 3, wherein the plurality of passages comprises at least one passage inclined at a first angle with respect to a plane defined by the plurality of legs and at least one passage inclined at a second angle with respect to said plane.

16. The chemical mechanical polishing apparatus as claimed in claim 3, further comprising a receiving track disposed on at least one of the legs wherein the receiving track comprises one or more external support portions disposed thereon at a predetermined angle relative to the cable run.

17. The chemical mechanical polishing apparatus as claimed in claim 16, wherein each external support portion comprises a first external support portion and a second external support portion cooperatively defining one of the passages.

18. The chemical mechanical polishing apparatus as claimed in claim 17, wherein a portion of said cable run is angled relative to a plane defined by the plurality of leg, and wherein the angle of said portion of said cable run is substantially tangential to a corresponding portion of the plurality of cables.

19. The chemical mechanical polishing apparatus as claimed in claim 17, wherein the predetermined angle and a clamping force of said external support portion are adjustable.

20. The chemical mechanical polishing apparatus as claimed in claim 17, wherein a position of said external support portion along said receiving track is adjustable.

21. The chemical mechanical polishing apparatus as claimed in claim 17, wherein a diameter of a top portion of said cable run is greater than a diameter of a bottom portion of said cable run.

22. A chemical mechanical polishing apparatus according to claim 2, wherein each of said plurality of passages circumscribes a corresponding cable.

23. A method for inhibiting tangling of a plurality of cables attached to a movable member capable of at least one of a rotating and a translating motion, comprising:

passing a plurality of cables in a first direction to be connected to the movable member through a corresponding plurality of cable passages along an outer portion of a cable support brace fixedly mounted relative to the movable member;

securing the plurality of cables within the plurality of cable passages;

turning the plurality of cables in a second direction;

passing the plurality of cables through at least one opening in an interior portion of the cable support brace; and connecting the plurality of cables to said movable member vertically displaced in a second direction from the cable guide.

24. A method for inhibiting tangling of a plurality of cables attached to a movable member capable of at least one of a rotating and a translating motion according to claim 23, wherein said second direction is substantially opposite to the first direction.

25. A cable support apparatus, comprising:

a support brace having one or more legs disposed about a cable run having one or more cables disposed therein;

at least one spaced apart passage disposed on each leg and configured to at least partially surround the cables; and at least one detachable clamping plate configured to retain the cables within the passages.

26. The cable support apparatus according to claim 25, further comprising at least one resilient member disposed on an interior portion of the passages and the clamping plate.

27. The cable support apparatus according to claim 25, wherein the support brace is attached to a plurality of mounting arms.

28. A cable support apparatus, comprising:

a support brace having one or more legs disposed about a cable run having one or more cables disposed therein;

at least one spaced apart passage disposed on each leg and configured to at least partially surround the cables, wherein the passages are inclined at an angle with respect to a plane defined by the one or more legs.

29. The cable support apparatus according to claim 28, wherein the passages are substantially perpendicular to the plane defined by the one or more legs.

30. The cable support apparatus according to claim 29, wherein a center line of each of the passages intersects a center line of the cable run at a point above the plane defined by the one or more legs.

31. A cable support apparatus, comprising:

a support brace having one or more legs disposed about a cable run having one or more cables disposed therethrough; and at least one spaced apart passage disposed on each leg and configured to at least partially surround the cables, wherein the passages comprise at least one passage inclined at a first angle with respect to a plane defined by the one or more legs and at least one passage inclined at a second angle with respect to the plane.

\* \* \* \* \*